(12) United States Patent
Ressler et al.

(10) Patent No.: US 11,907,879 B2
(45) Date of Patent: Feb. 20, 2024

(54) SYSTEM AND METHOD FOR RENEWABLE POWER SYSTEM INTERCONNECTION SUBMISSION PROCESSING WITH THE AID OF A DIGITAL COMPUTER

(71) Applicant: Clean Power Research, L.L.C., Napa, CA (US)

(72) Inventors: Jeffrey Ressler, Kirkland, WA (US); Scott Tewel, Sammamish, WA (US); Robert Orleth, Bellevue, WA (US); Jeremy Stone, Kirkland, WA (US)

(73) Assignee: CLEAN POWER RESEARCH, L.L.C., Napa, CA (US)

( * ) Notice: Subject to any disclaimer, the term of this patent is extended or adjusted under 35 U.S.C. 154(b) by 0 days.

(21) Appl. No.: 18/180,829

(22) Filed: Mar. 8, 2023

(65) Prior Publication Data
US 2023/0222418 A1    Jul. 13, 2023

Related U.S. Application Data

(63) Continuation of application No. 17/535,360, filed on Nov. 24, 2021, now Pat. No. 11,676,086, which is a continuation of application No. 16/886,674, filed on May 28, 2020, now Pat. No. 11,195,130, which is a continuation of application No. 14/800,686, filed on Jul. 15, 2015, now Pat. No. 10,699,231.

(51) Int. Cl.
*G06Q 10/00*    (2023.01)
*G06Q 10/0631*    (2023.01)

(52) U.S. Cl.
CPC .............. *G06Q 10/06316* (2013.01)

(58) Field of Classification Search
CPC ........................................ G06Q 10/00
USPC ........................................ 705/7.26
See application file for complete search history.

(56) References Cited

U.S. PATENT DOCUMENTS

2009/0106079 A1* 4/2009 Gutlapalli .............. G06Q 30/04
705/7.26
2013/0144546 A1* 6/2013 Brackney ................ G06F 30/13
702/61

* cited by examiner

*Primary Examiner* — Mustafa Iqbal
(74) *Attorney, Agent, or Firm* — Leonid Kisselev

(57) ABSTRACT

A graphical workflow definition and management tool enables administrators and other authorized users to implement a workflow process that can be used to evaluate project submissions or other applications that require step-by-step process completion. The steps required to navigate through the workflow are first defined. Inputs, outputs, and actions, including conditional criteria, can be specified for the steps. The flow of control between the individual steps in the workflow is mapped out; changes to the status of a project submission can cause a submission to migrate to a succeeding step in the workflow. A "sandbox" testing environment allows changes to any aspect of the workflow to be safely evaluated without affecting live data. Conflicts between production and test workflows are identified and intelligently resolved.

17 Claims, 20 Drawing Sheets

100  Roles

| Name | Privilege | Access Breadth | Is Program Admin? |
|---|---|---|---|
| ⊕ User | Read/Write | Specific (Owned or Granted) | No |
| ⊕ Administrator | Read/Write | All | Yes |
| ⊕ Inspector | Read/Write | Specific (Owned or Granted) | No |

120

Deadline Name

Review New Application within 7 days

Last modified on 11/13/2014 at 8:46 AM by Scott Admin (Administrator)

Set [every ▼] time the status becomes: [Application in Process ▼]

Due in: [7] days from creation

Status by status change to: [Application Review ▼]

MODIFY PROGRAM

Please review the list of changes below and confirm changes will be applied to the production program a

Program Changes

Forms
New: Inspector Review Form
Modified: NV Energy Net Metering Application

Data Fields
New: Cleared for Construction?

Interconnection Application

| 1 | 2 | 3 | 4 | 5 | 6 |
|---|---|---|---|---|---|
| Facility Information | Applicant Information | Contractor/Installer Information | Description of Service | Interconnect Agreement | Supporting Documentation |

This application applies for the connection of renewable energy systems located on a customer's premises that will be connected to NV Energy's electric system through the customer's electrical service panel and meter. The renewable energy system must be 1,000 kilowatts or less in generating capacity.

Application Date*
6/5/2014

Facility Contact Person*
First    Last

Company Name

Address

Phone Number*

ADD A FIELD | FIELD PROPERTIES

| Single Line Text | Static Text |
| Paragraph Text | Check Box |
| Integer | Decimal |
| Drop-down List | Multiple Choice |
| Name | Date |
| Address | Price |
| Email Address | Price Summation |
| Document Generation | Page Break |
| Attachment | PV System |
| Signature Request | Energy Star Furnace |

ADD A FIELD | FIELD PROPERTIES

| Single Line Text | Static Text |
| Paragraph Text | Check Box |
| Integer | Decimal |
| Drop-down List | Multiple Choice |
| Name | Date |
| Address | Price |
| Email Address | Price Summation |
| Document Generation | Page Break |
| Attachment | PV System |
| Signature Request | |

ADD A FIELD | FIELD PROPERTIES

Label
[Please Describe]

Data Field
[Please Describe]

⊕

Default Value
[          ]

Required Field ☐
Conditional Visibility ☑

Show this field if:
[Possible meter access issues ▼]
[Is Equal To ▼]
[Other]

[Delete]

◄ Back  Next ►

Generation Type – Prime Mover*
[Other]

Please Describe
[          ]

Host Customer*
Name*
[          ]

Company
[          ]

Address*
[          ]
[          ]
[          ]

Email*
[          ]

Phone*
[          ]

Account Number from bill*
[          ]

Premise Number*
[          ]

Meter Number*
[          ]

Next ►

ADD A FIELD | FIELD PROPERTIES

Label
[Please Describe]

Default Value
[          ]

Required Field ☑
Read Only ☐

Help Text
[This should be of the format:
XX-XXX-XXXX.]

Help Link
[www.cleanpower.com]

Conditional Visibility ☐

Field Name
[Account Number]

⊙ Rename field
⊙ Use a different data field

[Delete]

Fig. 21. 440

| | Description | Last Changed Date |
|---|---|---|
| ⊕ | Application Received | 2/20/2014 6:44:45 PM |
| ⊕ | Customer Experience Survey | 2/21/2014 12:02:53 AM |
| ⊕ | Inspection Failed | 2/21/2014 12:03:05 AM |
| ⊕ | Inspection Passed | 2/21/2014 12:02:46 AM |
| ⊕ | Inspection Scheduled | 2/21/2014 12:02:34 AM |
| ⊕ | Review Deadline Missed – ACTION Needed | 2/21/2014 12:03:20 AM |
| ⊕ | Suspended – Incorrect Information | 2/21/2014 12:01:40 AM |

✉ Communications — New Template

Fig. 22. 460

From: DoNotReply@PowerClerk.com
To: {data:Applicant Email}
Cc: {data:Host Customer Email}; {data:System Owner Email}
Bcc:
Subject: Application Complete – {full_name: Customer} ({data:Account Number})

Figment Light & Power

Name: {full_name: Host Customer} ({data: Account Number})
Site Address: {address: Physical Site Address}

Interconnection Review Result: This application is complete. Interconnection review was completed on {data:Date Interconnection Review Completed}.

Interconnection review Comments: {data: Interconnection Review Comments}

Net Metering Review Result: Customer is eligible for Net Metering. Net Metering review was completed on {data: Date Net Metering Review Completed}

NEM review Comments: {data: Net Metering Review Comments}

Next Step: Engineering Review

This is an automated message.

p >> strong    Words: 75

| | Template Name | Description | Last Update | Form References |
|---|---|---|---|---|
| New Template Definition | | | | |
| ⊕ | Application | | - | 1 |
| ⊖ | Document Template Example | | - | 0 |
| ○ Uploading Document Te | Cancel | | | |
| | Template Name | Description | Last Update | Form References |

ADD A FIELD | FIELD PROPERTIES

Label
[Please Explain]

Attachment
[Agreement ▼]
⊕ Rename field
Generate/Sign Document ▲

Document Template
[Agreement ▼]

Esignature options
[Required ▼]

Signatories
Customer

First Name Field:
Customer Name
Last Name Field:
Customer Name
Email Field:
Customer Email ⊕ Add signatory Label
[Contractor]
First Name
[Company Name]
Last Name
[Company Name]
Email Address
[Company Email]

[Add]

Agreement E-Sign

[ Browse... ]

◀ Back   Next ▶

Actions

Add Action

Add Action

On [First ▼] change
to the [Submitted ▼] status
do action: [Set Deadline ▼]

Select deadline: [Review New Application ▼]

[Cancel] [Add]

Status | Frequency
No automatic actions added
Status | Frequency

[Cancel] [Save]

Fig. 28.   580

My Report

Project Number

Current Status

Last Status Change Time

Company Address
-Line 1

Company Address
-Line 2

Company Address
-City

Company Address
-State

| Zip Code |

[Cancel] [Preview] [Save]

ADD A COLUMN | COLUMN CONTROLS

| Project Number | Customer Name |
| Current Status | Customer Name 2 ⊕ |
| Last Status Change Time | Customer Phone Number ⊕ |
| Air Conditioning Type | ENERGY STAR Furnace ⊕ |
| Company Address ⊖ | Heating Fuel Type |
|   City | Heating System Type |
|   Line 1 | |
|   Line 2 | Installation Type |
|   State | |
|   Zip Code | |
| Company Email | NMGC Account Number |
| Company Fax ⊕ | Rep Name ⊕ |
| Company Name | Representative Name |
| Company Phone Number ⊕ | Year Home Built |

Fig. 31.
640
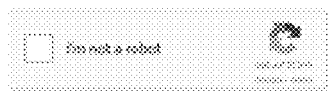
Fig. 32.
660

Fig. 35.   720
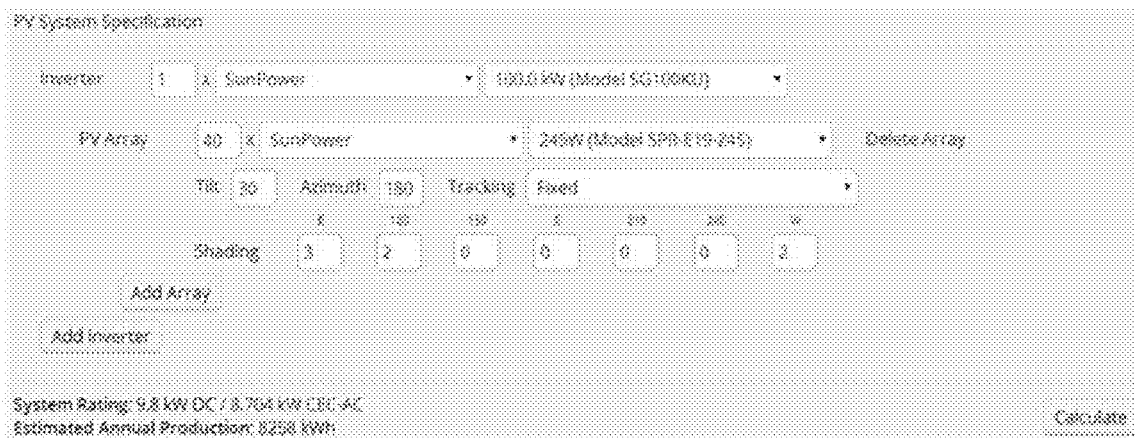
Fig. 36.   740
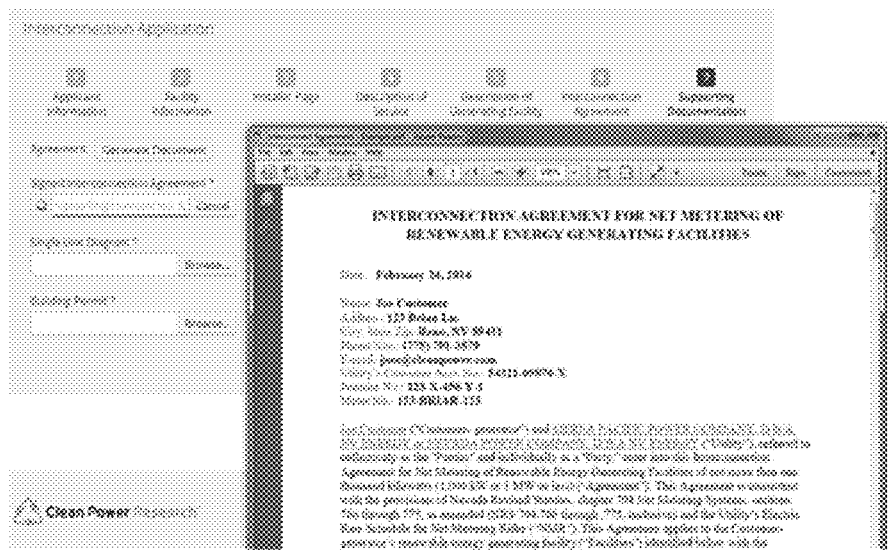
Fig. 37.   760

780

800

820

SYSTEM AND METHOD FOR RENEWABLE POWER SYSTEM INTERCONNECTION SUBMISSION PROCESSING WITH THE AID OF A DIGITAL COMPUTER

FIELD

The present invention relates in general to power interconnection workflow and, in particular, to a system and method for renewable power system interconnection submission processing with the aid of a digital computer.

BACKGROUND

Orchestrating the orderly completion of nearly any project or endeavor of more than modest complexity and which takes collaborative effort invariably requires the definition and management of a workflow. Simply put, a workflow can be thought of as constituting a series of sequentially- or successively-occurring steps, processes or statuses, where the series is initiated at some defined point in the workflow and is terminated at some point later in the workflow. A simple workflow defines a single unidirectional flow of steps, each step following from the prior step, with only a single point of initiation and a single point of termination. More complex workflows may have multiple points of initiation and termination, could spawn out-of-band (independent) processes or sub-workflows, and may include unidirectional, bidirectional or circular flows, and conditional criteria that direct the workflow along divergent courses that can run in tandem or completely different directions than earlier steps or, if an out-of-band process has been spawned, along independent yet parallel workflow paths. Still other forms of workflows and control are possible.

Workflows are frequently encountered in the approval process followed by an administrative agency or other organization or bureaucracy that is charged with ensuring adherence to and compliance with a regulatory scheme or other set of rules or fixed criteria. Administrative procedure generally requires the agency to follow a systematic process of step-by-step intake and review, which typically includes checking incoming submissions or applications for completeness, setting project deadlines, requesting additional information from the applicant as necessary, communicating the status of the submission, coordinating each submission with the stakeholders within the agency that are charged with enforcing different aspects of the regulatory scheme or with other entities or third parties as appropriate, generating documentation, running reports, and chronicling the outcomes of each step of the review process before an interim or final disposition is assigned, whether under review, approved, denied, suspended, withdrawn, and so forth. Other review steps and outcomes are possible.

Before undertaking a new project, an applicant will ordinarily be asked to make a formal submission or application in writing when seeking to gain the agency's approval. A complete submission is expected to proceed through the review process and actions may be automatically triggered when the submission reaches certain steps in the review process. Some steps in the review process may cause the submission to branch or fork in a different direction of review based upon the nature of the submission, a finding by a stakeholder, or some other factor. As well, at any point, the applicant may decide to withdraw the submission entirely or make a change that requires reinitiating or revisiting part or all of the review process. If all of the necessary reviews are satisfactorily completed, the submission will ordinarily be granted approval; otherwise, the submission will either be denied or, when appropriate, may remain under review until either withdrawn by the applicant, or canceled or suspended by the agency. Other interim and final dispositions from the review process are possible.

Workflows are widely used outside the dominion of administrative agency procedure and can be found in nearly any field of endeavor that requires step-by-step process completion. For instance, roughly speaking, the manufacturing of a product requires steps of creating an initial design, fabrication or acquisition of constituent components, final assembly, and packaging. Similarly, real estate sales require the steps of disclosures, inspections, loan approval, funds release, escrow, closing, and title recordation. Workflows can even be found in non-business related activities, such as wedding planning, which requires the booking of various venues, coordination of the services provided by different vendors, and careful scheduling well in advance of the blessed event.

Workflows are not static and changes to the enabling regulatory scheme or other set of rules or fixed criteria can trigger modifications to or the revamping of a workflow. Virtually all aspects of a workflow are subject to change, including the form and entry point of submissions, the individual steps undertaken by stakeholders and others, the flow and conditions that submissions follow in navigating through the review process, and the situations under which the review process may be overridden. Often, an administrative agency will be bound to honor the workflow in existence at the time that a submission was received, if even temporarily, such as when a submission is "grandfathered." However, other forms of workflow are not so encumbered and submissions caught in the wheels of change may need to be revised or shuffled about in the review process.

Existing approaches to workflow modeling focus on a serialization of steps flowing in a unidirectional manner. For instance, the Workflowfirst product, licensed by Riaform Technology, Thiells, NY, provides a graphical user interface in which the routing of forms can be specified. The routing is defined in a hierarchical fashion and step-by-step flow is enforced.

Therefore, a need remains for an interactive tool for defining and managing a complex workflow.

SUMMARY

A graphical workflow definition and management tool enables administrators and other authorized users to implement a workflow process that can be used to evaluate project submissions or other applications that require step-by-step process completion. The steps required to navigate through the workflow are first defined. Inputs, outputs, and actions, including conditional criteria, can be specified for the steps. The flow of control between the individual steps in the workflow is mapped out; changes to the status of a project submission can cause a submission to migrate to a succeeding step in the workflow. A "sandbox" testing environment allows changes to any aspect of the workflow to be safely evaluated without affecting live data. Conflicts between production and test workflows are identified and intelligently resolved.

In one embodiment, a system and method for renewable power system interconnection submission processing with the aid of a digital computer is provided. A submission is processed through a workflow for interconnecting a building to a renewable energy system, by a server under a control of a power utility associated with an interconnection to the renewable energy system, using an application programming interface (API) implemented as a Representational State Transfer web service, the workflow including a plurality of status steps connected in a path by one or more connectors, the status steps comprising an entry point into the workflow step and an exit point from the workflow step. The processing includes accepting the submission as input into the workflow via the entry point as a current status, including: receiving user input using the API over a secure web communication protocol from a software application associated with the user, the user input comprising a selection of equipment comprised in the renewable energy system; determining based on the user input one or more characteristics of the renewable energy system; and setting at least some of the characteristics as data comprised in the submission. The processing further includes: updating the current status of the submission to the status step next occurring along the path through the workflow defined by each connector; and generating an output from the workflow when the current status includes the exit point, the output including an approval of the interconnection of the renewable energy system, wherein the building is interconnected to the renewable energy system based on the approval.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

BRIEF DESCRIPTION OF THE DRAWINGS

FIG. 5 is a screen shot showing, by way of example, a form defined by use of the method of FIG. 2.

FIG. 6 is a screen shot showing, by way of example, an electronic signature block for use in the method of FIG. 2.

FIG. 11 is a screen shot showing, by way of example, a deadline defined by use of the method of FIG. 2.

FIG. 12 is a screen shot showing, by way of example, a warning generated prior to committing changes from the test environment for use of the method of FIG. 2.

FIG. 17 is a screen shot showing, by way of example, a drag-and-drop forms creation tool for use of the method of FIG. 2.

FIG. 18 is a screen shot showing, by way of example, the types of form fields available for use of the method of FIG. 2

FIG. 19 is a screen shot showing, by way of example, a conditionally visible field configured using the method of FIG. 2.

FIG. 20 is a screen shot showing, by way of example, help text and a help link configured using the method of FIG. 2.

FIG. 21 is a screen shot showing, by way of example, a list of communications templates for use in the method of FIG. 2.

FIG. 22 is a screen shot showing, by way of example, a built-in rich text HTML editor for use in the method of FIG. 2.

FIG. 23 is a screen shot showing, by way of example, a document template upload for use in the method of FIG. 2.

FIG. 24 is a screen shot showing, by way of example, an online form with an eSignatures configuration for use in the method of FIG. 2.

FIG. 27 is a screen shot showing, by way of example, an actions configuration dialog for use in the method of FIG. 2.

FIG. 28 is a screen shot showing, by way of example, a report editor for use in the method of FIG. 2.

FIG. 31 is a screen shot showing, by way of example, an application self-registration dialog for use in the method of FIG. 2.

FIG. 32 is a screen shot showing, by way of example, a home page with a listing of applications for use in the method of FIG. 2.

FIG. 33 is a screen shot showing, by way of example, an interconnection application form for use in the method of FIG. 2.

FIGS. 34 and 35 respectively are screen shots showing, by way of example, equipment selection and automatic equipment calculations forms for use in the method of FIG. 2.

FIG. 36 is a screen shot showing, by way of example, an electronic attachments and document generation form for use in the method of FIG. 2.

FIG. 37 is a screen shot showing, by way of example, administrator controls on the Home page for use in the method of FIG. 2.

DETAILED DESCRIPTION

Figure 1:
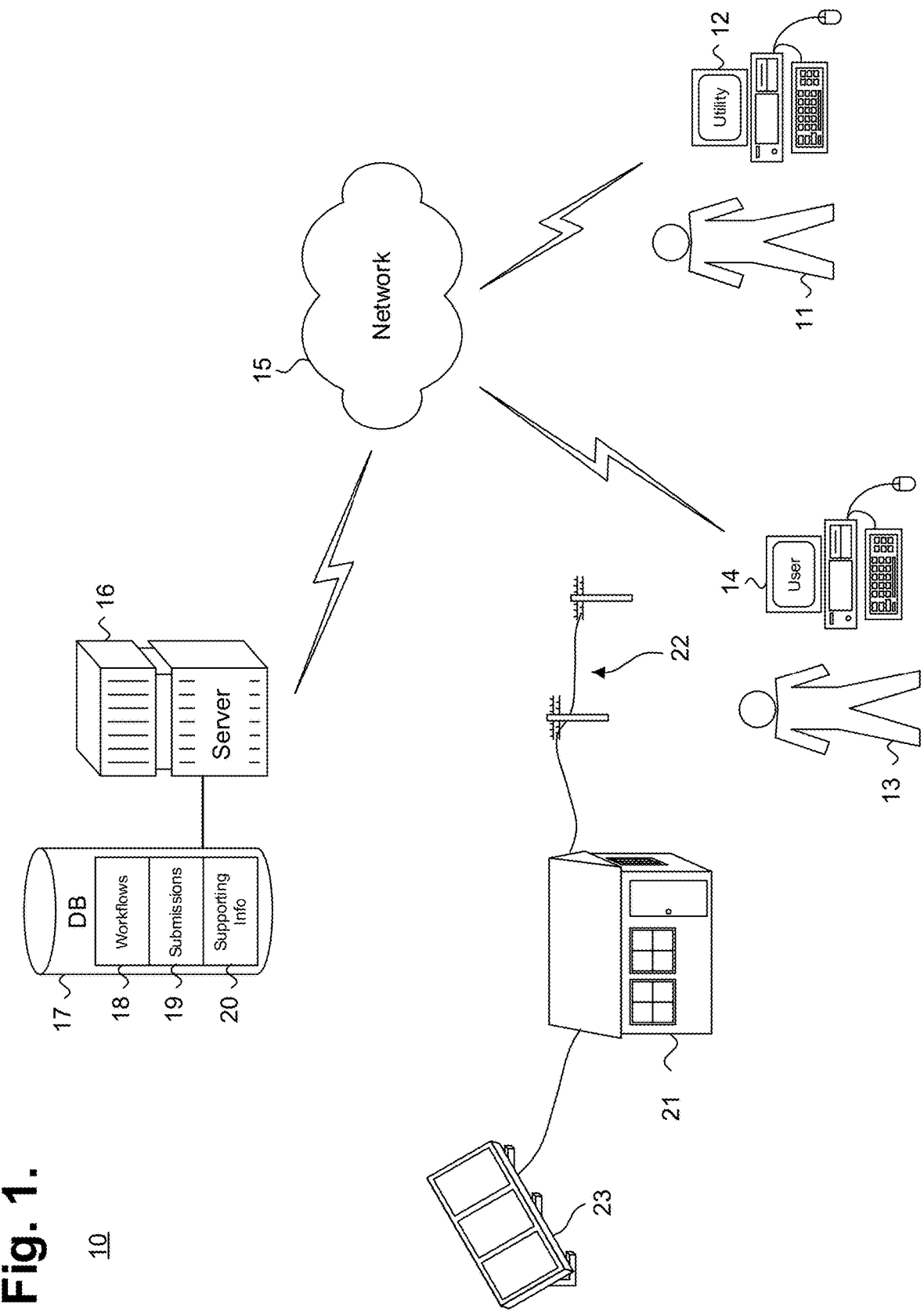
FIG. 1 is a block diagram showing a computer-implemented system for defining a workflow for power interconnection.

A good example of a workflow can be seen in the approval process followed by an administrative agency, such as a power utility charged with reviewing requests for power interconnection of a renewable energy system. The approach taken in implementing and practicing the workflow is representative of workflows of all kinds. FIG. 1 is a block diagram showing a computer-implemented system 10 for defining a workflow for power interconnection. The system 10 includes a server 16 or similar component under the administrative oversight of an electric utility 11. The electric utility 11 need not have a physical presence with the server 16; rather, the electric utility 11 could instead have a computer 12 that interfaces with the server 16 over a wide area network 15, such as the Internet. Other manner of interfacing an electric utility 11 with a server 16, whether remotely or on-site, are possible.

The electric utility 11, through the server 16, is in remote communication with one or more users 13, who could be ratepayers, installers or other applicants that hold an account with the electric utility 11 for purchasing power for a home 21 or other structure and who are seeking interconnection 22 of a renewable energy system 23, such as a photovoltaic power generation system, with the electric utility 11. Each user 13 has a computer 14 that interfaces with the electric utility's computer 12 over a wide area network 15, such as the Internet.

To enable users to seek approval of an interconnection 22, one or more workflows 18 are implemented and stored in a database 17 coupled with the server 16. The electric utility 11 also stores submissions or applications for interconnection 19 and any supporting information 20 provided by users in the database 17. Except where indicated to the contrary, the terms "submission" and "application" will be used interchangeably.

Figure 2:
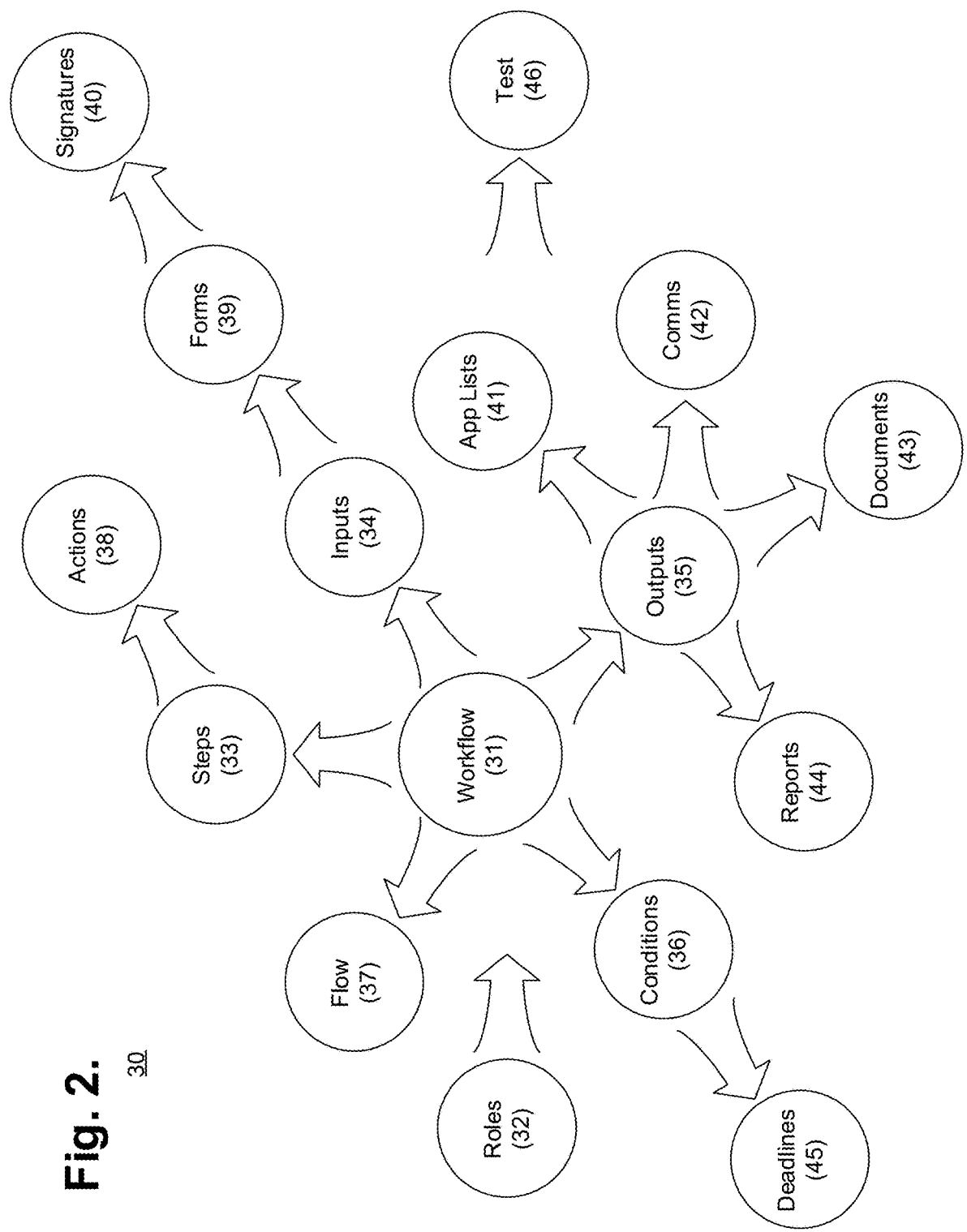
FIG. 2 is a block diagram showing a computer-implemented method for defining a workflow for power interconnection.

Each workflow 18 can be defined through an interactive program executed by the electric utility 11 on a Web browser or similar application running on the computer 12. Each workflow requires identifying the roles of the participants to the workflow, specifying the form and entry point of submissions and the resulting outputs from the workflow, determining the steps required to advance through the workflow, connecting the individual steps, and defining any override conditions that can subsume the otherwise orderly step-by-step progression of a submission through the workflow. FIG. 2 is a block diagram showing a computer-implemented method 30 for defining a workflow 31 for power interconnection. The method 30 can be implemented in software and execution of the software can be performed on a computer as a series of process or method modules or steps. The approach described can be applied mutatis mutandis to other fields of endeavor.

Figure 3:
FIG. 3 is a screen shot showing, by way of example, a listing of role definitions for use in the method of FIG. 2.

As a preliminary to actual workflow definition, the roles that can be assigned to users of the workflow (step 32) are first designated. FIG. 3 is a screen shot 100 showing, by way of example, a listing of role definitions for use in the method 30 of FIG. 2. The roles are configurable by administrators, who have full control over workflow definition and oversee submission review in a self-service configuration. Administrators can authorize other users to define and modify workflows. Support for the creation of new roles, for instance, inspector, distribution engineer, and so forth, is also provided, as further described infra with reference to Table 1.

Referring back to FIG. 2, at a high level, defining a workflow (step 31) requires specifying the steps, processes, or statuses (step 33) that need be taken, along with identifying the inputs (step 34), identifying any outputs (step 35), defining any conditions (step 36) that need be satisfied for each step, and, lastly, mapping out the flow (step 37) from one step to the next. Once at least one step has been specified, the remaining steps can be performed in any order, for example, conditions can be assigned to a step before identifying any inputs or outputs, and so forth. The steps will now be described in more detail.

A workflow 31 can be thought of as defining a series of sequentially- or successively-occurring steps, processes or statuses (step 31), where the series is initiated at some defined point in the workflow and is terminated at some point later in the workflow. Except where indicated to the contrary, the terms "step," "process," and "status" will be used interchangeably.

Figure 4:
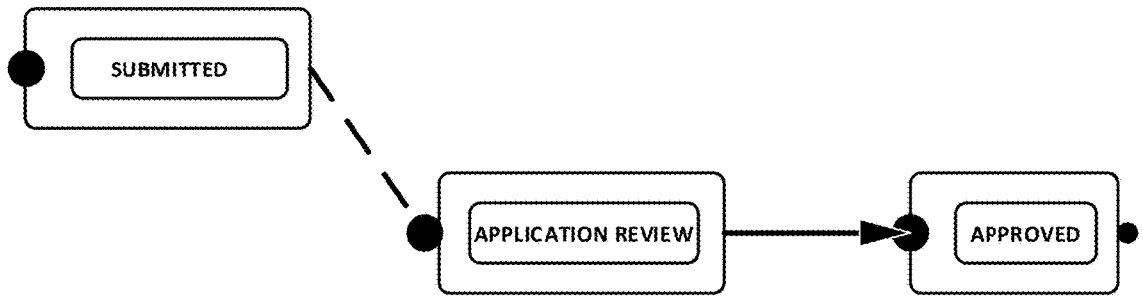
FIG. 4 is a screen shot showing, by way of example, a workflow defined by use of the method of FIG. 2.

All types of workflow definitions are supported. FIG. 4 is a screen shot 120 showing, by way of example, a workflow defined by use of the method 30 of FIG. 2. At one extreme, a workflow can be a simple workflow that defines a single unidirectional flow of steps, each step following from the prior step, with only a single point of initiation and a single point of termination. More complex workflows may have multiple points of initiation and termination, could spawn out-of-band (independent) processes or sub-workflows that happen in parallel to the "parent" spawning workflow, and may include unidirectional, bidirectional or circular flows, and conditional criteria that direct the workflow along divergent courses that can run in tandem or completely different directions than earlier steps or, if an out-of-band process has been spawned, along independent yet parallel paths. Out-of-band processes may be required, for example, when a certain approval document needs a (digital) signature or review of an attorney or official at a municipal utility managing its interconnection. That sub-workflow may be automated on its own; the program would spawn or initiate the sub-workflow while other aspects of an application or project are being reviewed and even advanced along the main "parent" workflow.

Figure 14:
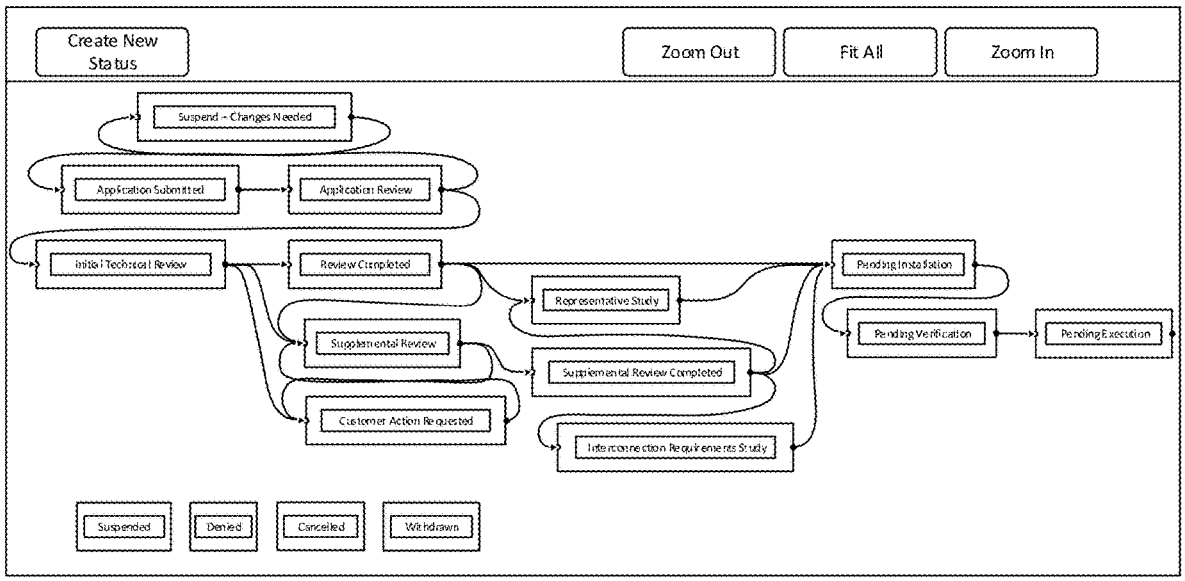
FIGS. 14, 15 and 16 respectively are screen shots showing, by way of example, graphical workflow editors and status creation box for use of the method of FIG. 2.
Figure 15:
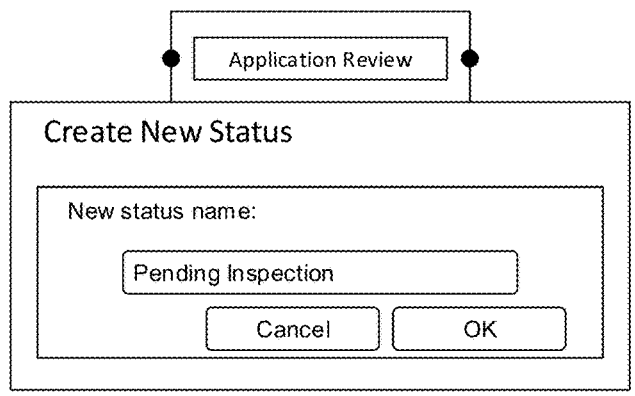

The workflow is defined using a graphical workflow editor while the steps ("statuses") are created using a status creation box, as further described infra respectively with reference to FIGS. 14 and 15. One or more action may be associated with each step (step 38). Actions enable administrators to build automation into a workflow and can include automatically sending communications or activating deadlines based on a change in status, as further described infra with reference to FIG. 27. Still other forms of workflow, steps, and actions are possible.

Referring back to FIG. 2, the inputs to the workflow are specified (step 34), including one or more entry points into the workflow into which a submission or application can be made. Usually, inputs will be associated with a particular step, but could be specified to be more generally applicable to the workflow overall. Inputs from users are obtained by defining interactive forms (step 39). FIG. 5 is a screen shot 130 showing, by way of example, a form defined by use of the method 30 of FIG. 2. Administrators can setup and modify each form and multiple forms per workflow are accommodated, as further described infra with reference to FIGS. 17-20. The data fields of the form can be context-sensitive with the conditional visibility of fields adjusted dynamically to the meet the requirements of the submission and lower user data input errors or confusion. Other ways to specify workflow inputs are possible.

In addition, signatures of the applicants can be electrically collected (step 40). FIG. 6 is a screen shot 140 showing, by way of example, an electronic signature block for use in the method 30 of FIG. 2. The electronic signature block streamlines and makes secure the signature routing process and eliminates the need for paper hardcopy signatures, as further described infra with reference to FIGS. 23 and 24. Electronic signature processing can be provided by a third party service, such as DocuSign, Inc., San Francisco, CA Other forms of electronic signature processing are possible.

Figures 7, 8:
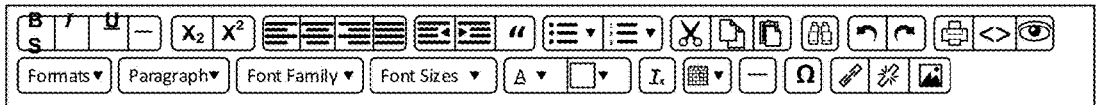
FIG. 7 is a screen shot showing, by way of example, a listing of applications currently pending in a defined workflow by use of the method of FIG. 2.
FIG. 8 is a screen shot showing, by way of example, a communication defined by use of the method of FIG. 2.

Referring back to FIG. 2, the outputs from the workflow also need to be specified (step 35), which can include generating status listings of applications (step 41), communications (step 42), documents (step 43), and reports (step 44). Usually, inputs will be associated with a particular step, but could be specified to be more generally applicable to the workflow overall. For instance, FIG. 7 is a screen shot 160 showing, by way of example, a listing of applications currently pending in a defined workflow by use of the method 30 of FIG. 2. The listing provides a high degree of transparency on the status of applicants and administrators. In addition, the columns in the listing can be configured per workflow by the administrator or other authorized user.

Figures 9, 10:
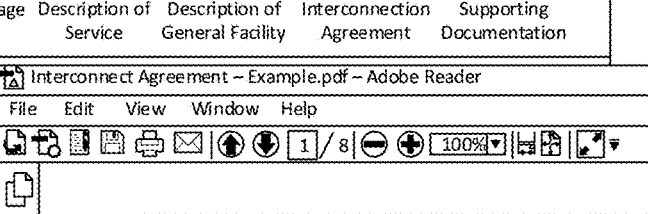
FIG. 9 is a screen shot showing, by way of example, a document defined by use of the method of FIG. 2.
FIG. 10 is a screen shot showing, by way of example, a report defined by use of the method of FIG. 2.

Other outputs may be step-specific. FIG. 8 is a screen shot 180 showing, by way of example, a communication defined by use of the method 30 of FIG. 2. The communication is populated with data gleaned from the submission using a template that is configurable by administrators or other authorized users, as further described infra with reference to FIGS. 21 and 22. The communication can be set up for automatic dispatch to an applicant or upon demand. FIG. 9 is a screen shot 200 showing, by way of example, a document defined by use of the method 30 of FIG. 2. Like a communication, the document is populated with data gleaned from the submission using a template that is configurable by administrators or other authorized users and can be automatically generated. Finally, FIG. 10 is a screen shot 220 showing, by way of example, a report defined by use of the method 30 of FIG. 2. The report provides a comprehensive listing of the record of each submission. Predefined and ad hoc reports can also be created, as further described infra with reference to FIGS. 28 and 29. Documents are generally used to create an agreement or other written communique specific to the application. Reports, however, are intended for use by administrators or other authorized users. Other ways to specify workflow outputs are possible. One or more steps of a workflow may be subject to conditions (step 36) that can alter the flow of review processing or direct a particular outcome. For instance, a homeowner's interconnection request may require a different level of review than a submission from a solar energy installation company. Conditions may be defined in terms of actions, resources, time, or other constraints. A simple deadline (step 45) is one common type of condition. FIG. 11 is a screen shot 240 showing, by way of example, a deadline defined by use of the method 30 of FIG. 2. The deadline is automatically activated in response to a submission reaching a particular step in the review process and is configurable by administrators or other authorized users, as further described infra with reference to FIG. 26. Other types of conditions are possible.

Referring back to FIG. 2, workflows are not static and changes to the enabling regulatory scheme or other set of rules or fixed criteria can trigger modifications to or the revamping of a workflow. However, changing a workflow that has already been put into actual production can cause problems for submissions already under review. As a result, changes to any aspect of the workflow can be safely tested (step 46) through the use of a "sandbox" testing environment that allows changes to be evaluated without affecting live data. The workflow changes will only come into effect when an administrator or other authorized user commits the changes. FIG. 12 is a screen shot 260 showing, by way of example, a warning generated prior to committing changes from the test environment for use of the method 30 of FIG. 2. All changes are highlighted and any conflicts between the production and test workflows are intelligently resolved, such as the elimination of a data field from a form, which could leave data already provided by applicants otherwise hanging.

Figure 13:
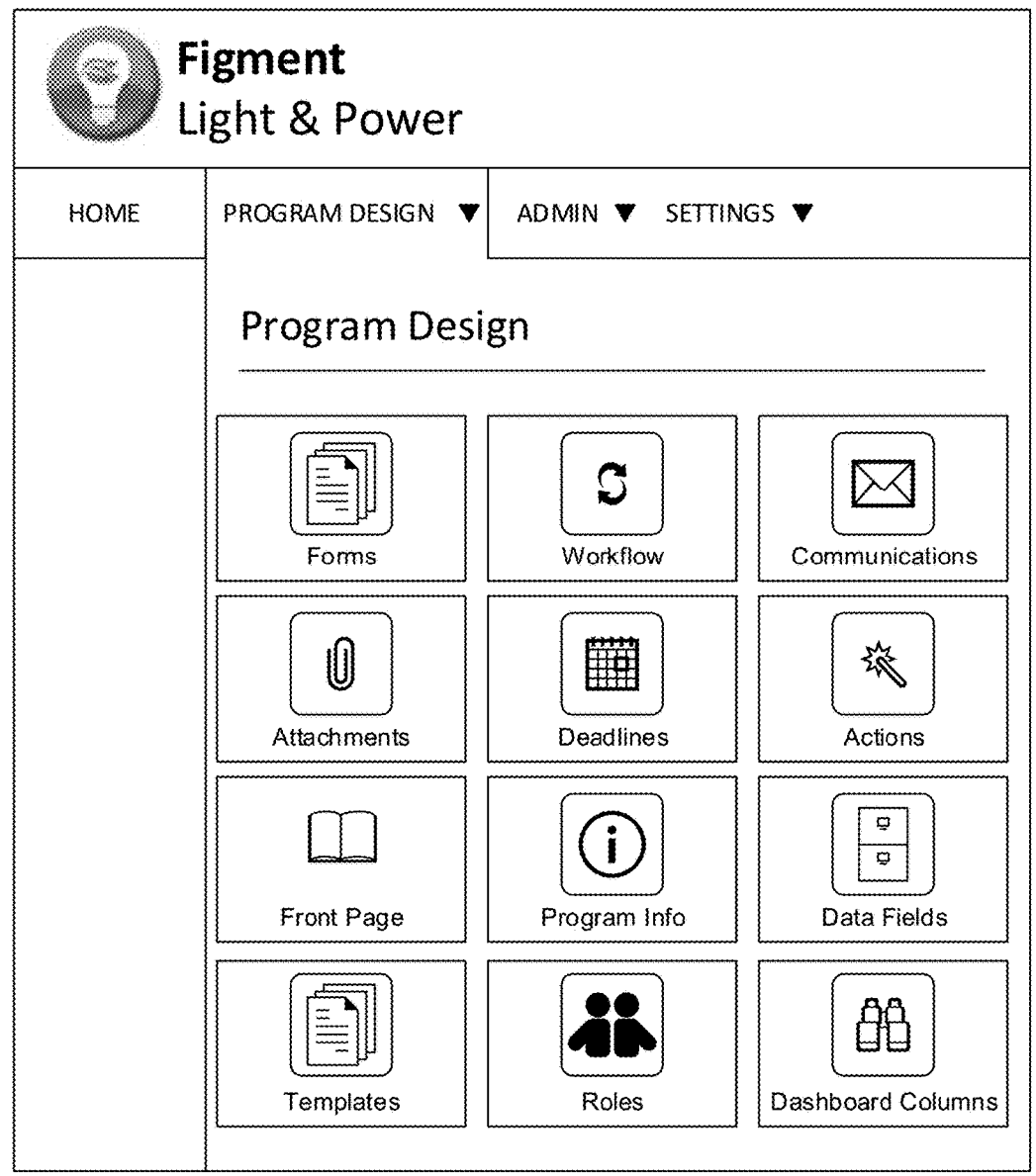
FIG. 13 is a screen shot showing, by way of example, a program design menu for use of the method of FIG. 2.

Administrators have a number of tools at their disposal to create and modify a program's workflow, forms, communications, templates, deadlines, actions, reports, and so forth. FIG. 13 is a screen shot 260 showing, by way of example, a program design menu for use of the method 30 of FIG. 2. Each tool is available by selecting one of the icons in the menu. The tools have been designed to provide flexibility and control to administrators and other authorized users by enabling them to develop unique, program-specific workflows based on each program's specific requirements. The various tools will now be discussed.

Figure 16:
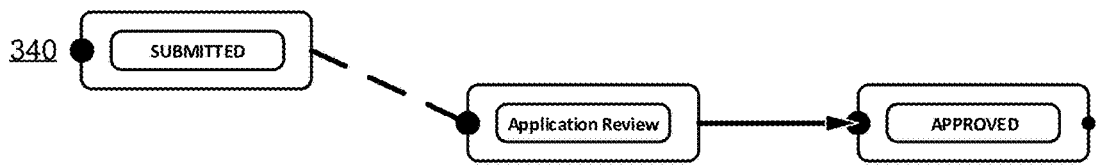

Administrators have self-service control over the workflow for each process review program, and each program can have a unique workflow. FIGS. 14, 15 and 16 respectively are screen shots 260, 280 and 300 showing, by way of example, graphical workflow editors and status creation box for use of the method 30 of FIG. 2. Referring first to FIG. 14, the administrator can create a workflow using the graphical workflow editor that includes one or more steps, also called processes or statuses, and interconnections or arrows between the steps, which map out the "flow" from one step to the next. Thoughtful naming and configuration of the workflow can greatly aid in streamlining and organizing a program. The flow can be unidirectional, bidirectional, and circular. (Bidirectionality is created by mapping two unidirectional counter-opposing interconnections between the same two steps.) Communications and deadlines can be set up to be automatically triggered on a status change.

Administrators have the freedom to make changes to an existing program's workflow at any time as requirements evolve. If a status is deleted by an administrator and any submissions remain in that deleted status, the submission will still show as being in the deleted status until moved to some other active status. For instance, a submission currently in the "Application Review" status will remain in the now-deleted "Application Review" status until the administrator manually reviews that submission and reassigns the submission to some other active status. This failsafe avoids a situation whereby an submission is reassigned to an incorrect status due to a status deletion. Referring next to FIG. 15, a new status can be created by assigning a name. Referring finally to FIG. 16, existing statuses can be deleted and the control flow between statuses can be changed by also using the graphical workflow editor. For simplicity, any status may also be defined as "Always Available," which adds convenience as a few common terminal statuses, for instance, cancelled, denied, and so on, may become relevant at any time during the lifecycle of an application. Such "Always Available" statutes effectively act as overrides to the step-by-step review process and can be invoked regardless of the current status of a submission or its whereabouts in a workflow.

Forms are configurable by administrators, and can include logic that makes the forms dynamic, that is, responsive and adaptive based on user input. Data required in submission, such as an interconnection application, are entered into the application form by the applicant and are visible to the administrator upon submission. The data fields in a form are global to the entire program. In effect, a form is a "view" onto global data. Each form references the global data fields; multiple forms may reference the same data fields. Each submission form is composed of data entry fields, each uniquely labeled and positioned by the administrator or other authorized user. Most submission processes will require multiple application forms. In addition, forms can be role-sensitive, such that a form can be set up to appear differently depending upon the role assigned to the user. For simplicity, a particular form will always look and function the same way for all roles; however, different forms can be defined and made available to only particular roles, so as to appear and behave differently than the "same" form that appears to a user under another role. Forms are also versioned. Submissions show the form version with which they were originally created. Administrators may promote submissions to a newer form version, either automatically or as a manual process.

Administrators define the fields contained in an online form through an interactive tool. FIG. 17 is a screen shot 360 showing, by way of example, a drag-and-drop forms creation tool for use of the method 30 of FIG. 2. The positions of fields on the online form are specified via the drag-and-drop user interface. FIG. 18 is a screen shot 380 showing, by way of example, the types of form fields available for use of the method 30 of FIG. 2. The administrator drags each field from the list of options on the right side of the page, and drops the field onto the form. The following list describes the field types which can be included in a form. Additional field types are possible and not all field types will be applicable to all program types:

Single Line Text
    Free-form text entry field useful for a range of data entry requirements, such as account number, and so forth.
Static Text
    Text embedded into the form, such as general information, instructions, or other notes. Supports some HTML formatting.
Paragraph Text
    Same as Single Line Text, but this free-form text field supports multiple lines of text.
Check Box
Integer
    Whole numbers only; min and max can be specified.
Decimal
    Same as integer but allows decimal expressions. Min and max can be specified.
Drop-Down List
    List with entries specified by administrator.
    Forces user to choose a single response.
Multiple Choice
    List with entries specified by administrator.
    Forces user to choose a single response.
Name
Date
Address
    With "Same As" property enabled, an address can be indicated as being the same as another address that has already been populated in the form. For example: the System Owner's Address is the same as the Host Customer's Address. In this case, the dependent Address becomes a read-only copy of the "master" Address.
Price
    Similar to Decimal; limited to two decimal places and formatted as USD.
Contact
    Combination of: Name, Company, Address, Phone Number, and Email Address in one element.
    With "Same As" property enabled, a contact can be indicated as being the same as another contact that has already been populated in the form. For example: the System Owner Contact is the same as the Host Customer Contact. In this case, the dependent Contact becomes a read-only copy of the "master" Contact.
Summation
    Sums two or more other data fields chosen from a list of eligible fields including: "Price," "Integer," "Decimal," "PV System Nameplate Rating" or "PV System CEC Rating" data fields.
    Displays 0 to 3 decimal places and can include a unit, such as $, kW, before or after the calculated value.
Page Break
    Separates the form into multiple pages, each can be given a unique name by the administrator.
Email Address
PV System
    A complex control to receive detailed PV system specifications and calculate projected annual performance.
    Linked to CEC PV equipment lists and updated daily.
    Has the notion of multiple inverters and multiple arrays connected to an inverter.
    Contains the following fields:
        Inverter Quantity
        Inverter Manufacturer
        Inverter Model
        Panel Quantity
        Panel Manufacturer
        Panel Model
        Tracking System—None, Single-Axis, Dual-Axis
        Tilt—defined per array
        Azimuth—defined per array
        Shading—can be monthly percentages or azimuthal
    Runs a PV simulation on their system in PowerClerk Interconnect using CPR's SolarAnywhere® PV simulation technology, such as described in commonly-assigned U.S. Pat. Nos. 8,165,811; 8,165,812; 8,165,813, all issued to Hoff on Apr. 24, 2012; U.S. Pat. Nos. 8,326,535 and 8,326,536, issued to Hoff on Dec. 4, 2012; U.S. Pat. No. 8,335,649, issued to Hoff on Dec. 18, 2012; and U.S. Pat. No. 8,437,959, issued to Hoff on May 7, 2013, the disclosures of which are incorporated by reference, and TMY3 insulation data.
    Calculates DC rating, CEC-AC rating, and Design Factor based on CEC equipment specs and orientation.
Attachment
    For upload of electronic attachments, generation of documents from templates specified by the administrator, as well as configuration of eSignatures.
Signature Request
    Required for routing of eSignatures.

In addition, other more complex field types are possible, such as multi-control dependent conditionality and other forms of chained control logic.

The administrator can generate a preview of the form in its current state in a new browser window during the editing process without needing to commit changes. Changes to a form can be discarded with the cancel button or committed with the save button.

Most fields in an online form can be marked as required using a red asterisk. Integer and decimal fields permit the administrator to specify minimum and maximum acceptable values; the field will reject entries outside of the acceptable range. Similarly, the Email and Zip Code field will reject entries outside of acceptable formats.

Also, most fields can be configured to be conditionally visible. Conditional visibility enables the administrator to specify the condition under which the field becomes visible or invisible to the applicant, and thus enables the form to adjust its requirements dynamically. Dynamic forms minimize applicant confusion by hiding fields that are not pertinent, thus reducing the overall length of the application, and the number of opportunities for an applicant to make a mistake. FIG. 19 is a screen shot 400 showing, by way of example, a conditionally visible field configured using the method 30 of FIG. 2. The administrator specifies that the "Please Describe" field is only visible when the applicant selects "Other" in the preceding field, "Generation Type—Prime Mover." Naturally, if the generation type was defined in a different entry in the dropdown list, the applicant would not need to specify the generation type in a text field.

Additionally, the administrator may specify help Text or a help link for nearly every field type. Either form of help will be visible to the applicant when clicking the blue help icon visible on a data field. FIG. 20 is a screen shot 420 showing, by way of example, help text and a help link configured using the method 30 of FIG. 2. Other ways to provide user assistance in an online form are possible.

The communications feature is a powerful and flexible way for administrators to automatically generate email communications to participants and other administrators. Administrators use a self-service interface to create communication templates, which are email templates that contain special tags that will later be filled in with submission-specific information, in a manner that is conceptually similar to a "mail merge" or address label merge in Microsoft Word or other tools. FIG. 21 is a screen shot 420 showing, by way of example, a list of communications templates for use in the method 30 of FIG. 2. Communications can be sent manually from the Admin view. Alternatively, communications can be configured to be sent automatically as a deadline reminder, or as an element of an action.

Administrators create and edit communication templates using a built-in editor. Administrators may create an unlimited number of communications templates. FIG. 22 is a screen shot 460 showing, by way of example, a built-in rich text HTML editor for use in the method 30 of FIG. 2. Each communications template is authored as a form of email with special tags, such as {data:Customer Email Address} and {data:Date Interconnection Review Completed} that are automatically filled-in with application-specific information at sending time. Rich text, including fonts, colors and tables, is supported. Images within email are supported as well, although images themselves must be hosted externally.

Generated documents may be defined to be available conditionally based on submission data, similar to electronic attachments. This functionality allows the administrator to upload document templates, which can be dynamically populated with information, similar to communication templates. FIG. 23 is a screen shot 480 showing, by way of example, a document template upload for use in the method 30 of FIG. 2. Typically, a submission process will require a live agreement document to be signed. Live documents commonly must be populated with information that has already been entered into the application, such as name, address and equipment type. Rather than have the applicant enter duplicate data, documents are generated using the data already entered by the applicant to streamline the process and reduce the risk of error through double data entry.

Specific documents are generated by replacing tags in a document template with data from the application. For instance, a document template might contain the following:

"Customer's Generating Facility is located at {address: Host Customer}."

The generated document would fill in the tags with application data and would appear in the form:

"Customer's Generating Facility is located at 123 Any Street, Napa, CA 94558."

Figure 25:
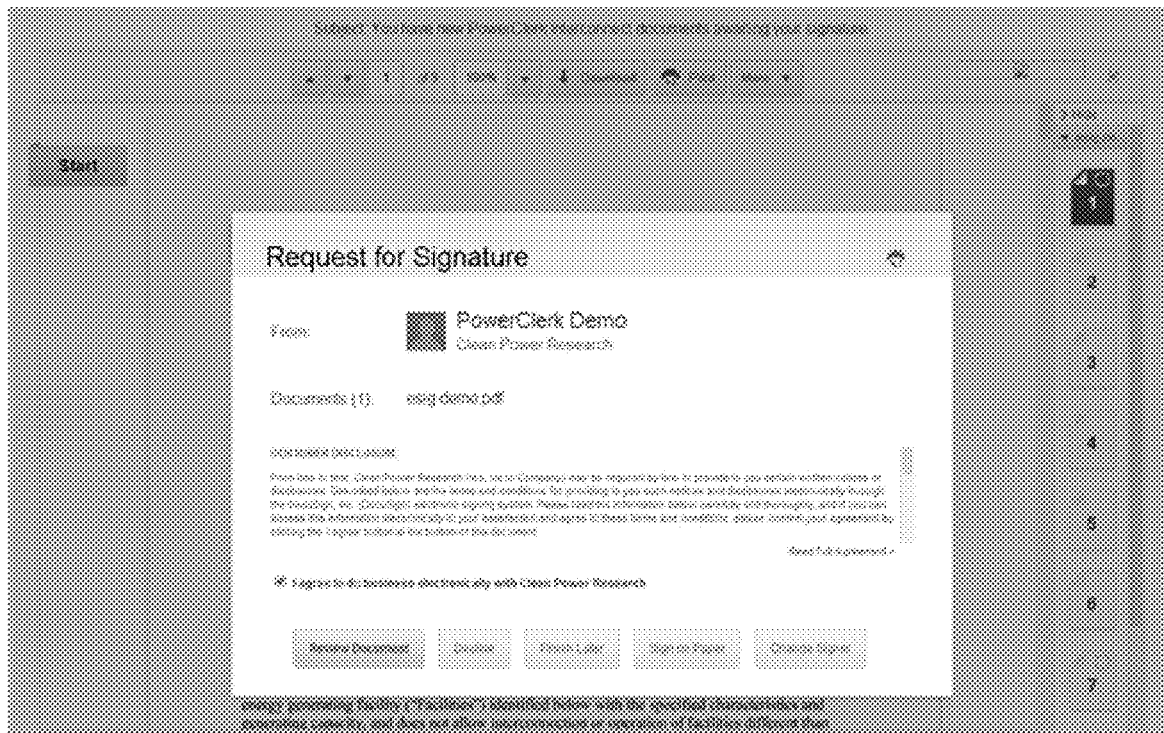
FIG. 25 is a screen shot showing, by way of example, an online form with an eSignatures request for use in the method of FIG. 2.

Integration with an electronic signature ("eSignature") service is supported. The administrator can configure which document templates can be signed electronically, and who the signatories are for each document. FIG. 24 is a screen shot 500 showing, by way of example, an online form with an eSignatures configuration for use in the method 30 of FIG. 2. Signature routing takes place via email to ensure that all signatories, including applicants, administrators, inspectors, outside lawyers, and so on, regardless of program access, can electronically sign documents associated with a submission as needed. Signatories are routed to a secure webpage from their email client to review each document and apply eSignatures. FIG. 25 is a screen shot 520 showing, by way of example, an online form with an eSignatures request for use in the method 30 of FIG. 2. After signing, the fully-executed document is uploaded automatically.

Figure 26:
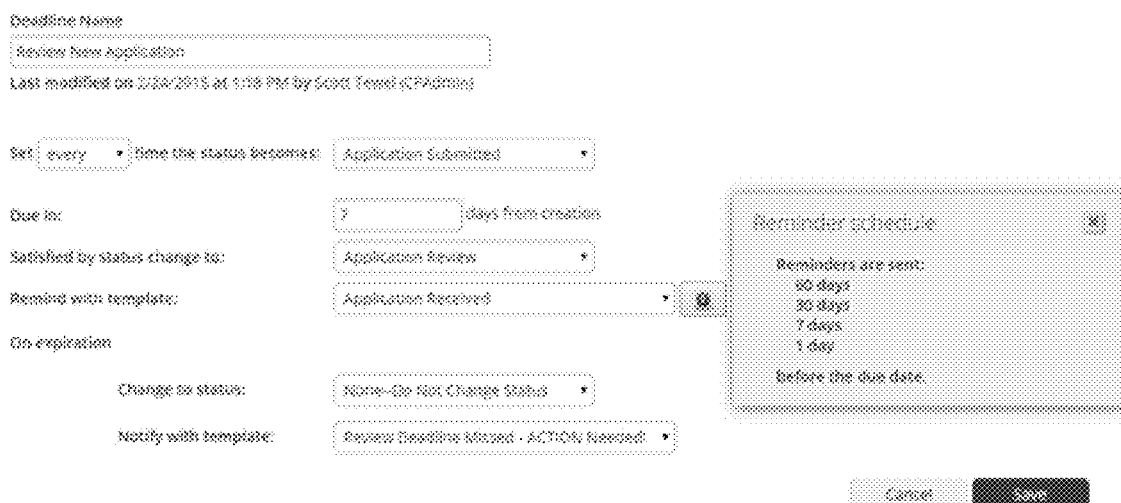
FIG. 26 is a screen shot showing, by way of example, a deadline editor for use in the method of FIG. 2.

Deadlines enable administrators to keep stakeholders abreast of the timing requirements for any submission. Reminder communications can be automatically sent prior to expiration of a deadline. Additional communications can also be sent, such as when a change in the status of a particular application occurs or when a deadline expires. FIG. 26 is a screen shot 540 showing, by way of example, a deadline editor for use in the method 30 of FIG. 2. The applicant can also configure a deadline which sends the administrator team reminder emails to perform review of an application. The deadline is satisfied once the application is moved into the application review status.

Actions enable administrators to build automation into their workflows. Actions are rules that get invoked when a submission enters a particular status. Actions can be used to send automatic communications and automatically activate deadlines, both based on a status change. FIG. 27 is a screen shot 560 showing, by way of example, an actions configuration dialog for use in the method 30 of FIG. 2. The administrator can configure an action that will automatically activate the "Review New Application" deadline the first time that an application enters the "Submitted" status. The deadline editor can be used to create actions.

Detailed reporting is available via a self-service report editor. Using the report editor, an administrator is able to define the program data that should be contained in a report. Reports are uniquely named by the administrator and fields are dragged and dropped onto a report design surface, in a manner similar to the form editor. FIG. 28 is a screen shot 580 showing, by way of example, a report editor for use in the method 30 of FIG. 2. When new fields are created in the form editor, a field name is assigned to that field by the administrator. Field names are used to create reports in the report setup user interface. When compound fields, such as "Company Address," are dropped onto the report, each element of the field appears individually on the report. Alternatively, the user may place individual elements on the report, such as zip code.

Figure 29:
FIG. 29 is a screen shot showing, by way of example, a report ready for download for use in the method of FIG. 2.

The administrator can configure and save filters for fields in a report to control which submissions are included. For instance, a filter could be defined to include in a particular report only submissions with "Sector=Commercial" and "Year Home Built >2000." The report output will contain one row per incentive application that matches all specified filters. Requested reports are queued and generated in order based on request date and time. Once a report is available, the user is notified via email. Reports are stored until picked up by the administrator and can also be downloaded to the administrator's local machine as a CSV data file. FIG. 29 is a screen shot 600 showing, by way of example, a report ready for download for use in the method 30 of FIG. 2. CSV data may be viewed, manipulated, and processed in a number of tools, including Microsoft Excel. Report results opened in Excel can, in turn, be easily saved in an Excel file format and thus include formulas, more extensive calculations and filtering.

Figure 30:
FIG. 30 is a screen shot showing, by way of example, a front page editor for use in the method of FIG. 2.

Each workflow program includes a custom URL (agencyname.powerclerk.com) and custom content shown on the front (login) page at that URL. Administrators have a built-in self-service editor to make, preview and publish changes to the customized front page. FIG. 30 is a screen shot 620 showing, by way of example, a front page editor for use in the method 30 of FIG. 2. Rich text and HTML are supported in the front page editor, which is identical to the communications editor.

The workflow system can be integrated through an application programming interface (API) implemented as an "REST" (REpresentational State Transfer") web service over HTTPS. API support is provided for data manipulation including: creating a new project, setting data in a form, submitting a form, updating project data, and retrieving project data. Additionally, a project's status may be changed by the administrator via the API.

The API will "enforce" the workflow, form requirements, roles, and other features in the same manner as provided with the user interface. For example, if a field such as "Customer Email Address" is marked as required in the form in the online user interface for purposes of submission, the same requirement would be enforced in the API. Similarly, if an automatic communication is configured to be sent each time that a new project is submitted, the automatic communication will be sent regardless of whether the project was submitted via the API or the Web-based user interface.

Once defined, applicants can use a workflow to make submissions or applications for review. An example of the applicant experience will now be provided in the context of a power interconnect request. Applicants must be registered. However, people and entities who are mentioned or occur within a workflow need not be registered; the program is still able to coordinate with these non-registered users, such as through email or other forms of communication. FIG. 31 is a screen shot 640 showing, by way of example, an application self-registration dialog for use in the method 30 of FIG. 2. Applicants can self-register for accounts; however, email verification is required prior to being able to login. Enabling applicants to self-register saves the administrative team time over an admin-managed applicant registration process. Applicants must enter all required information to request an account. When an account is requested, a time-sensitive verification email with a security code is automatically sent to the user to confirm the user's email address and complete registration.

Any applicant user account that requests access to the program can submit applications if self-registration has been enabled. Once the applicant has set up their account, they may log in to submit new applications or check the status of existing applications. FIG. 32 is a screen shot 660 showing, by way of example, a home page with a listing of applications for use in the method 30 of FIG. 2. Note that additional columns can be displayed as specified by the administrator to provide additional context to each application. The search box will search any of the column contents in the application listing.

Figures 33, 34:
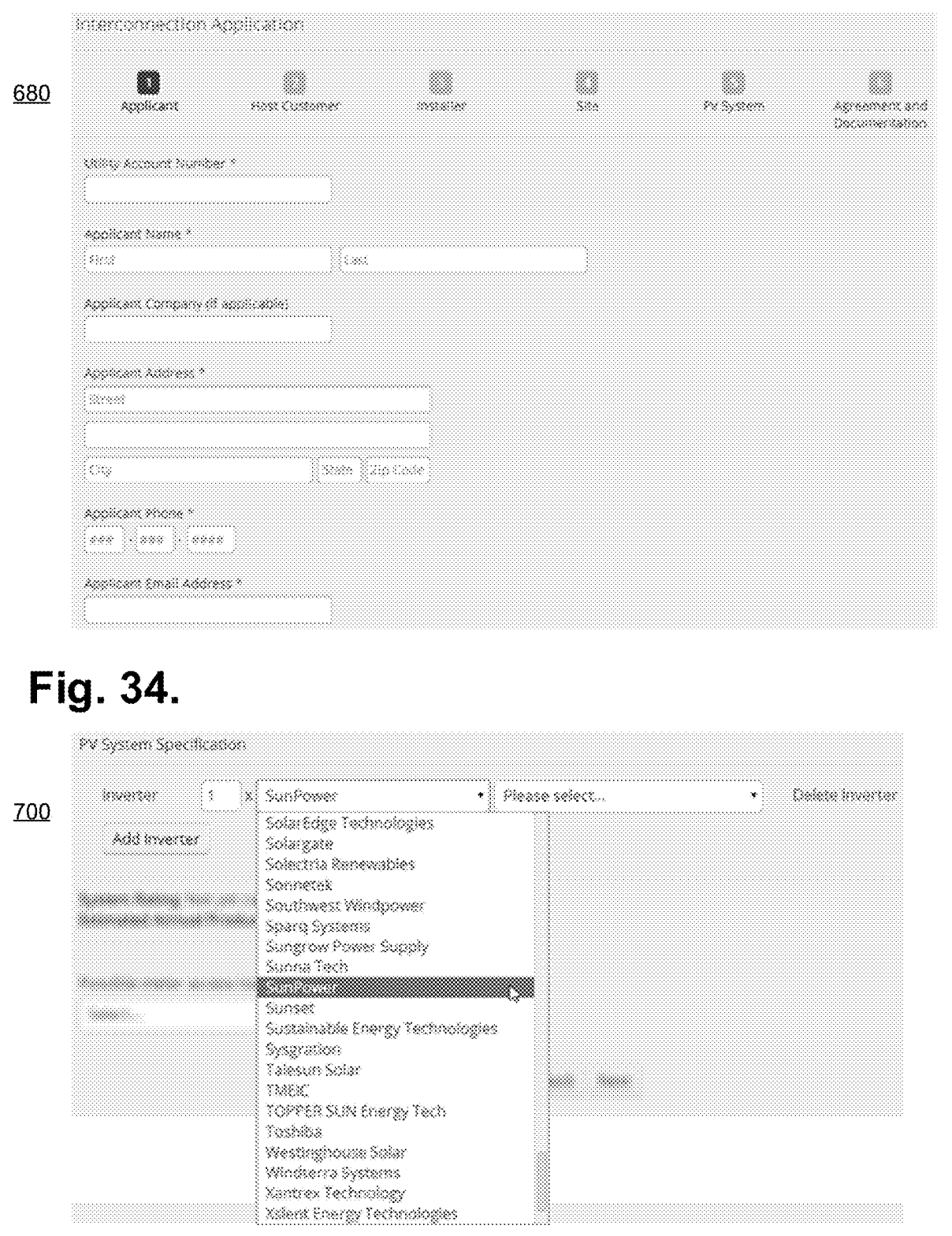

The applicant begins filling out a new application by clicking a "New Interconnection Application" button. Note that an administrator can set up a program for multiple types of submissions or projects, in which case the applicant would select the "New Interconnection Application" button appropriate to the desired type of application. FIG. 33 is a screen shot 680 showing, by way of example, an interconnection application form for use in the method 30 of FIG. 2. The interconnection application form is displayed as a series of task steps to be completed. These task steps will require the applicant to populate fields as designed in the form editor, which can include: Host Customer First/Last Name, Meter Number, Inverter Manufacturer, and so forth.

The data entered into the application form is automatically saved each time the user changes pages in the form. Incomplete (unsubmitted) applications are saved and the applicant may return at any point in the future, assuming that the administrators have not suspended the program or user in the meantime, to finish filling out an incomplete application.

Dropdown menu lists of equipment manufacturer and model are provided from which the applicant can select the relevant components for their application. Use of dropdown menu lists reduces applicant data entry mistakes and makes referencing of equipment ratings and specifications to calculate system ratings and estimated annual production possible. Rather than having the applicant enter an equipment rating and manually perform the total system rating calculation, the calculation is performed automatically. FIGS. 34 and 35 respectively are screen shots 700, 720 showing, by way of example, equipment selection and automatic equipment calculations forms for use in the method 30 of FIG. 2. In this example, the estimated annual production (kWh), DC rating and CEC-AC rating are calculated using specifications from the CEC equipment list, as well as the system location, orientation, and shading. The California Energy Commission (CEC) solar equipment lists are utilized, which can be accessed at http://www.gosolarcalifornia.org/equipment/. Only CEC-listed equipment is included in the program. Note that the operational specifications of a photovoltaic power generation system can also be inferred, such as described in commonly-assigned U.S. Pat. No. 8,1682, 585, issued to Hoff on Mar. 25, 2014, the disclosure of which is incorporated by reference.

Equipment ratings (inverter efficiency and module PTC rating) are drawn from the CEC list and cannot be overridden. Custom, unlisted, freeform or generic equipment cannot be entered. The CEC equipment Website is automatically scanned on a regular basis and any changes to the CEC site are automatically reflected, usually in less than a business day.

Many interconnection applications require supporting documentation, such as one- or three-line diagrams, to be included in the submission package. The applicant is able to upload electronic attachments directly into the application form from their Web browser. Electronic document attachments must be in PDF format and no greater than 5 MB per attachment. The list of supporting documents is entirely specified by the utility administrator. Electronic attachments can be marked as required with a red asterisk, and may also appear dynamically depending on entries in other data fields.

Documents, such as agreements, can be generated by the program. These documents can be populated with information from the application, as configured by the administrator. FIG. 36 is a screen shot 740 showing, by way of example, an electronic attachments and document generation form for use in the method 30 of FIG. 2. An example interconnection agreement document has been generated and uploaded as shown.

Once an application is submitted, the submission receives a unique project number and would ordinarily no longer be editable by the applicant. The applicant may use the "View" button to review the application data and electronic attachments, but may no longer make edits, unless the administrator returns the application into an applicant-editable state. Whether an application is no longer editable depends on whether the initial form is still available in the program's state, which is determined by the administrator. In the case of a two-step program, a second step application form will require review and editing by the applicant once the application enters a particular status. Both the workflow and the configuration of forms to statuses are configurable by the administrator. The applicant is able to see a complete summary of their in-progress and submitted applications in the main application listing, including the current status of each application.

The administrator is assigned a special status in the program. However, other roles are also specified. Roles are configurable by the administrator. Roles control who can see and do what actions at what time. A hierarchy of roles, each with uniquely defined permissions, can be specified by the customer. A typical set of roles for an interconnection program is shown in Table 1.

TABLE 1

| Role Name | Visibility | Typical Project Access |
| --- | --- | --- |
| Applicant | Only applications created by the applicant, or that have been assigned by another applicant | Read/Write when in Unsubmitted status. |
| Administrator | All applications | Read/Write |
| Report-only Administrator | All applications | Read only |
| Application-specific Inspector | Only applications that are assigned to the user by an Administrator | Read/Write |
| Super User (similar to Administrator) | All applications and additional administrative functions* | Read/Write |

*Additional administrative functions can include user administration, document template import and activation, communication template creation and activation, deadline creation, front page editing, and so forth.

Upon login, the administrator is directed to the Home page, which displays the listing of applications. FIG. 37 is a screen shot 760 showing, by way of example, administrator controls on the Home page for use in the method 30 of FIG. 2. The Home page displays all applications for the program, and a number of searchable and sortable columns that are configurable, but can include application status and most recent status date. The administrator can view any application to see a read-only summary, or use the "Admin" button to open the admin view of the application. The administrator may also delete an application from the Home page if in an unsubmitted status.

Figure 38:
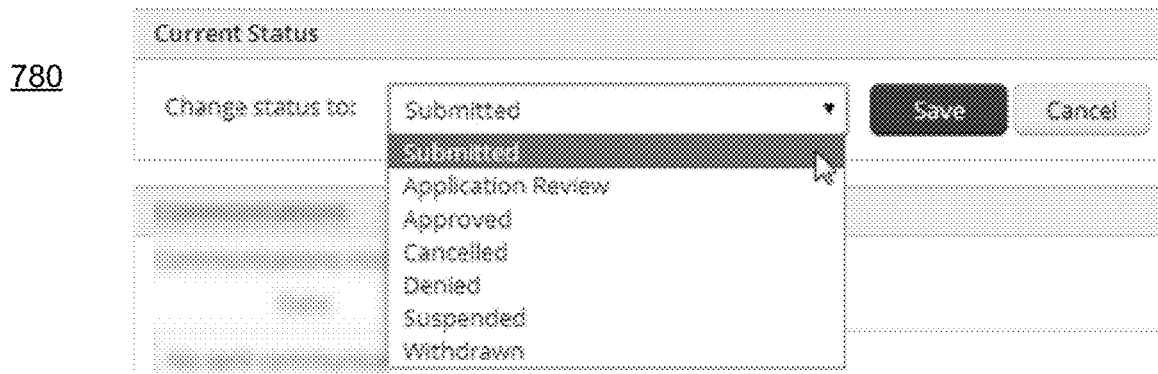
FIGS. 38, 39 and 40 respectively are screen shots showing, by way of example, administrator status controls for use in the method of FIG. 2.
Figure 39:
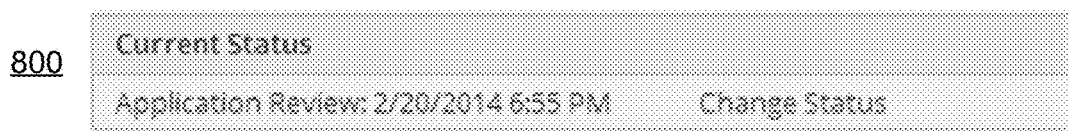
Figure 40:
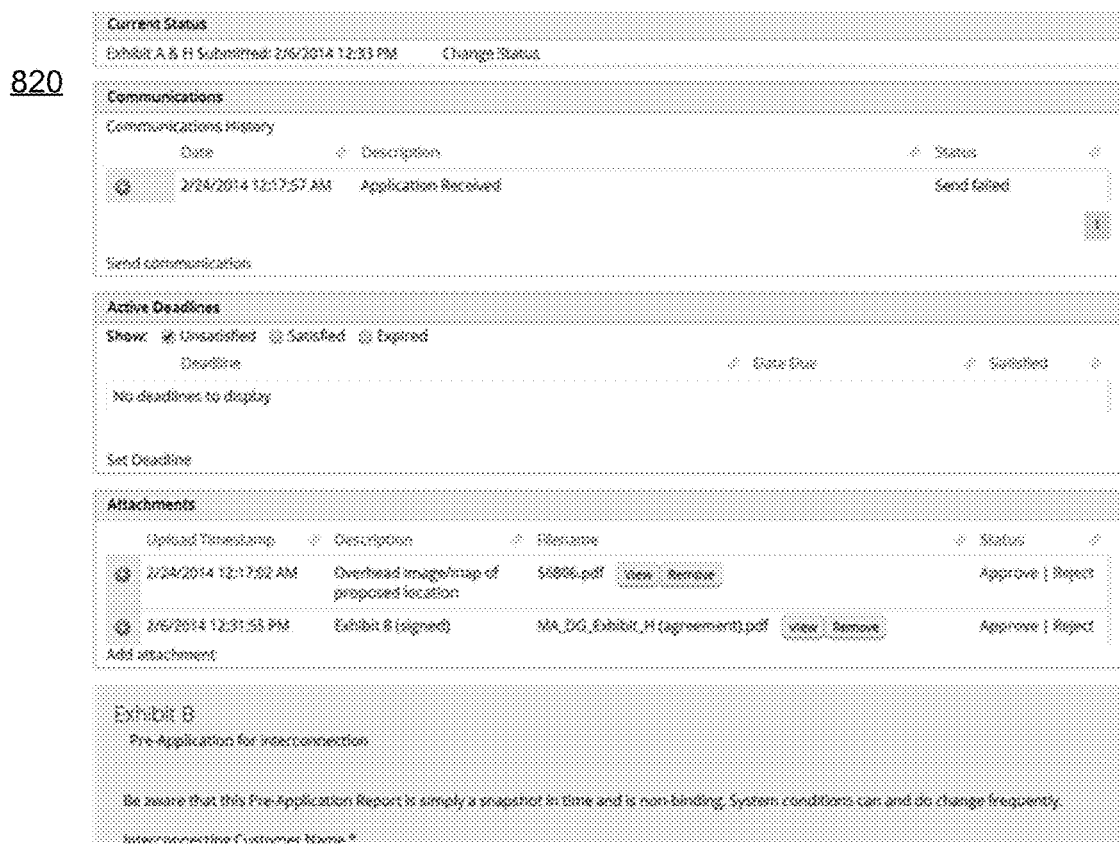

To review a particular interconnection submission, the administrator clicks the "Admin" button. FIGS. 38, 39 and 40 respectively are screen shots 780, 800, 820 showing, by way of example, administrator status controls for use in the method 30 of FIG. 2. The "Admin" view is a single-page overview of the entire application, and allows the administrator to:

Review the application, including any electronic attachments and signed documents
Change the application status
Send communications and view sent communications
Set deadlines, update deadlines, view satisfied or expired deadlines
View or edit project notes
Set assignee
View project data history (current and previous states of project data) Other administrator operations are possible.

Referring first to FIG. 38, the administrator can change the status for an application from "Submitted" to "Application Review" to indicate to the applicant that review is underway. Referring next to FIG. 39, the date and time of the most recent status change is indicated next to the status. Referring finally to FIG. 40, the administrator can also send communications to various stakeholders, including the applicant. Communications are typically (and most productively) generated based on pre-saved templates. The communications panel on the Admin view facilitates on-demand communications between the administrator and applicant, and provides an easily digestible summary of communications history. The communications panel tracks communications sent manually by the administrator, as well as those sent automatically by actions.

Deadlines can also be created, activated and deactivated from the Admin page. The Deadlines panel is placed near the top of the Admin view to provide the administrator easy access to activate and satisfy deadlines, and monitor active and expired deadlines. Deadlines keep the administrator, the applicant, and other stakeholders in line with project timelines as specified by the administrator.

The administrator can review each electronic attachment in a Web browser and can choose to approve or reject each attachment, enabling the administration team to track outstanding items which could be blocking an application from advancing to the next status. Also, the administrator can upload documents into a particular application from the Admin page. In the case of a Rejected document, the applicant could email an updated version of the document to rectify any issues and the administrator could then upload the document into the program.

If the application meets all program requirements, the administrator can advance the application to the next status in the workflow. Once the application process is complete, the administrator will place the application in a status, such as "Complete," "Approved," or similar.

In the case of an application with errors or an attachment that has been rejected, the administrator has a range of possible actions available to notify the applicant that additional action is needed to correct the deficiency. The administrator can send communications to the applicant, or the administrator can change the application status to "Suspended" or similar to indicate that additional action is needed.

While the invention has been particularly shown and described as referenced to the embodiments thereof, those skilled in the art will understand that the foregoing and other changes in form and detail may be made therein without departing from the spirit and scope of the invention.

The invention claimed is:

1. A system for renewable power system interconnection submission processing with the aid of a digital computer, comprising:
a server under a control of a power utility associated with an interconnection to a renewable energy system, the server configured to:
process a submission through a workflow for interconnecting a building to the renewable energy system using an application programming interface (API) implemented as a Representational State Transfer web service, the workflow comprising a plurality of status steps connected in a path by one or more connectors, the status steps comprising an entry point into the workflow step and an exit point from the workflow step, comprising:
accept the submission as input into the workflow via the entry point as a current status, comprising:
scan a third party website at predefined intervals;
update a menu of the equipment comprised in the renewable energy system based on the scan;
present to a user the updated menu;
receive user input using the API over a secure web communication protocol from a software application associated with the user, the user input comprising a selection of the equipment comprised in the renewable energy system, wherein the selection is made using the updated menu;
determine based on the user input one or more characteristics of the renewable energy system; and
set at least some of the characteristics as data comprised in the submission;
update the current status of the submission to the status step next occurring along the path through the workflow defined by each connector; and
generate an output from the workflow when the current status comprises the exit point, the output comprising an approval of the interconnection of the renewable energy system, wherein the building is interconnected to the renewable energy system based on the approval.

2. A system according to claim 1, wherein the menu comprises a dropdown menu.

3. A system according to claim 2, wherein the characteristics comprise one or more of annual photovoltaic power production, DC rating, and CEC-AC rating.

4. A system according to claim 1, the server further configured to assign an identifier to the submission.

5. A system according to claim 1, wherein the user is unable to edit the submission following an acceptance of the submission by the server.

6. A system according to claim 5, the at least one server further configured to make the submission editable by the user following a receipt of a command from a further user associated with an administrator role.

7. A system according to claim 1, wherein the user's ability to edit the submission following the acceptance of the submission by the server is dependent on the status step the current status of the submission is set at.

8. A system according to claim 1, the server configured to set one or more of the status steps as the current status of the submission based on input from a further user associated with an administrator role.

9. A method for renewable power system interconnection submission processing with the aid of a digital computer, comprising:
processing, by a server under a control of a power utility associated with an interconnection to a renewable energy system, a submission through a workflow for interconnecting a building to the renewable energy system using an application programming interface (API) implemented as a Representational State Transfer web service, the workflow comprising a plurality of status steps connected in a path by one or more connectors, the status steps comprising an entry point into the workflow step and an exit point from the workflow step, comprising:
accepting the submission as input into the workflow via the entry point as a current status, comprising:
receiving user input using the API over a secure web communication protocol from a software application associated with the user, the user input comprising a selection of equipment comprised in the renewable energy system;
determining based on the user input one or more characteristics of the renewable energy system; and
setting at least some of the characteristics as data comprised in the submission, wherein the user is unable to edit the submission following an acceptance of the submission by the server;
updating the current status of the submission to the status step next occurring along the path through the workflow defined by each connector; and
generating an output from the workflow when the current status comprises the exit point, the output comprising an approval of the interconnection of the renewable energy system, wherein the building is interconnected to the renewable energy system based on the approval.

10. A method according to claim 9, the server further configured:
presenting by the server to the user a menu of the equipment, wherein the equipment selection is made using the menu.

11. A method according to claim 10, wherein the menu comprises a dropdown menu.

12. A method according to claim 11, wherein the characteristics comprise one or more of annual photovoltaic power production, DC rating, and CEC-AC rating.

13. A method according to claim 10, further comprising:
scanning a third party website at predefined intervals;
updating the menu based on the scan.

14. A method according to claim 9, further comprising assigning by the server an identifier to the submission.

15. A method according to claim 9, further comprising making by the server the submission editable by the user following a receipt of a command from a further user associated with an administrator role.

16. A method according to claim 9, further comprising setting one or more of the status steps as the current status of the submission based on input from a further user associated with an administrator role.

17. A system for renewable power system building interconnection submission processing with the aid of a digital computer, comprising:
a server under a control of a power utility associated with an interconnection to a renewable energy system, the server configured to:
process a submission through a workflow for interconnecting a building to the renewable energy system using an application programming interface (API) implemented as a Representational State Transfer web service, the workflow comprising a plurality of status steps connected in a path by one or more connectors, the status steps comprising an entry point into the workflow step and an exit point from the workflow step, comprising:
accept the submission as input into the workflow via the entry point as a current status, comprising:
receive user input using the API over a secure web communication protocol from a software application associated with the user, the user input comprising a selection of equipment comprised in the renewable energy system;
determine based on the user input one or more characteristics of the renewable energy system; and
set at least some of the characteristics as data comprised in the submission, wherein the user's ability to edit the submission following the acceptance of the submission by the server is dependent on the status step the current status of the submission is set at;
update the current status of the submission to the status step next occurring along the path through the workflow defined by each connector; and
generate an output from the workflow when the current status comprises the exit point, the output comprising an approval of the interconnection of the renewable energy system, wherein the building is interconnected to the renewable energy system based on the approval.

* * * * *